United States Patent [19]
Phillips

[11] Patent Number: 5,979,141
[45] Date of Patent: Nov. 9, 1999

[54] WRAPPING DEVICE FOR LARGE ROUND BALER INCLUDING HOLDER FOR SPARE ROLL OF WEB WRAPPING MATERIAL

[75] Inventor: Kenneth Craig Phillips, Ottumwa, Iowa

[73] Assignee: Deere & Company, Moline, Ill.

[21] Appl. No.: 09/008,367

[22] Filed: Jan. 16, 1998

[51] Int. Cl.⁶ .................................................. B65B 41/00
[52] U.S. Cl. .......................... 53/389.2; 53/389.1; 242/337
[58] Field of Search .................... 53/118, 389.2, 53/389.3, 389.1, 587, 211; 242/118, 337, 312, 441.4

[56] References Cited

U.S. PATENT DOCUMENTS

| | | | |
|---|---|---|---|
| 4,185,442 | 1/1980 | Johnson et al. | 53/389.2 |
| 4,563,854 | 1/1986 | Ackermann et al. | 53/389.3 |
| 4,604,848 | 8/1986 | Clostermeyer | 53/118 |
| 4,691,503 | 9/1987 | Frerich | 53/389.3 |
| 4,995,216 | 2/1991 | Vansteelant | 53/118 |
| 5,152,123 | 10/1992 | Viaud et al. | 53/389.3 |
| 5,181,368 | 1/1993 | Anstey et al. . | |
| 5,692,365 | 12/1997 | Meyer et al. | 53/389.3 |

FOREIGN PATENT DOCUMENTS 92 11 541  12/1992  Germany .

*Primary Examiner*—Eugene L. Kim

[57] ABSTRACT

A large round baler is equipped with a device for wrapping bales with a web of net wrapping material. The device includes structure for supporting a spare supply roll of wrapping material a short distance vertically above a zone for containing an active supply roll of wrapping material. The structure for supporting the spare roll is selectively movable to a non-use position for permitting a pressure-applying roller, that normally engages the active supply roll of wrapping material, to be swung vertically out of the way so as to permit the spare supply roll to be moved into place as the active supply roll once the latter is depleted. A pair of retractable loading supports are provided for supporting the spare supply roll at a location rearwardly of the zone prior to moving the spare roll into the zone to take the place of the depleted active supply roll. A net guide roll has one end mounted for being selectively lifted to permit easier threading of a length of net that has been pulled from the spare supply roll when the latter is located on the loading supports.

6 Claims, 2 Drawing Sheets

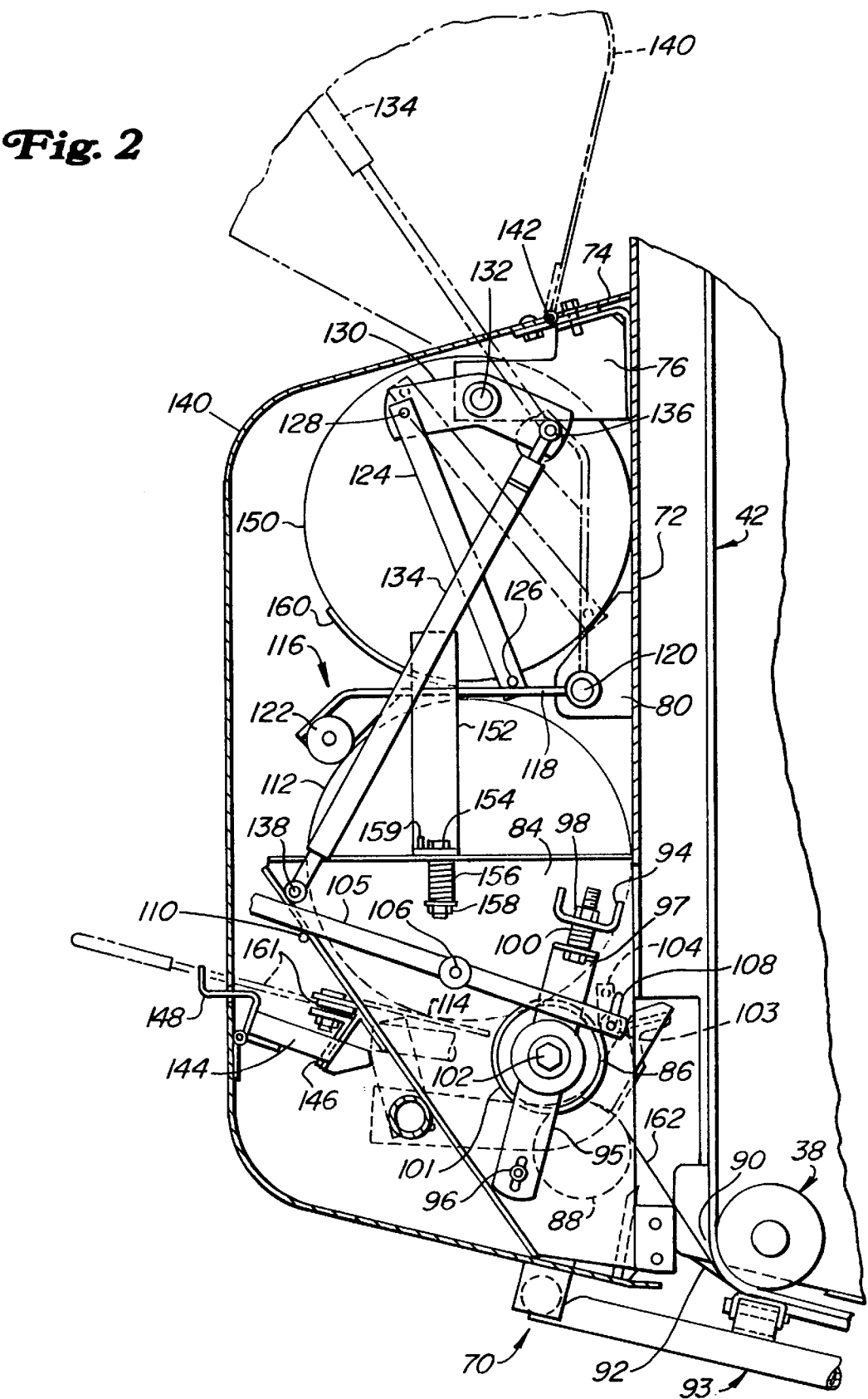

5,979,141

WRAPPING DEVICE FOR LARGE ROUND BALER INCLUDING HOLDER FOR SPARE ROLL OF WEB WRAPPING MATERIAL

BACKGROUND OF THE INVENTION

The present invention relates to wrapping devices for use with large round balers for wrapping bales formed in the baling chambers of these balers.

Conventionally, large round balers are known which are equipped with wrapping devices that include feed rolls for pulling a length of material, such as plastic sheeting or net formed into a web, from a supply roll, and routing it to the baling chamber where the material is wrapped about the bale. For example, see U.S. Pat. No. 5,181,368 granted to Anstey et al. on Jan. 20, 1993. Because the supply roll of material may become depleted at a location quite a distance from where additional supply rolls are kept, it is desirable to carry a spare supply roll on the baler. However available space for mounting a holder for the spare roll in an easily accessible area without increasing the width of the baler is not easily found and, when found, are often inconveniently located relative to where the active supply roll is mounted. For example one known baler has its active roll located at the rear of the baler, such as disclosed in the above-mentioned patent, while the spare supply roll is mounted at the front of the baler.

SUMMARY OF THE INVENTION

According to the present invention there is provided and improved way of storing a spare supply roll of wrapping material on a large round baler equipped with a device for wrapping bales with such wrapping material.

An object of the invention is to provide a way of storing a spare supply roll of wrapping material on a baler so that it may be conveniently accessed and moved to the position for use as the active supply roll.

A more specific object of the invention is to provide a storage location for a spare supply roll of wrapping material which is located above, and within the same cover that contains, the active supply roll of wrapping material.

These and other objects will become apparent from a reading of the ensuing description together with the appended drawings.

BRIEF DESCRIPTION OF THE DRAWINGS

FIG. 2 is an enlarged right side elevational view of a portion of the wrap material delivery system showing the arrangement for holding a spare supply roll of wrapping material in a location above the active wrap material supply roll.

DESCRIPTION OF THE PREFERRED EMBODIMENT

Figure 1:
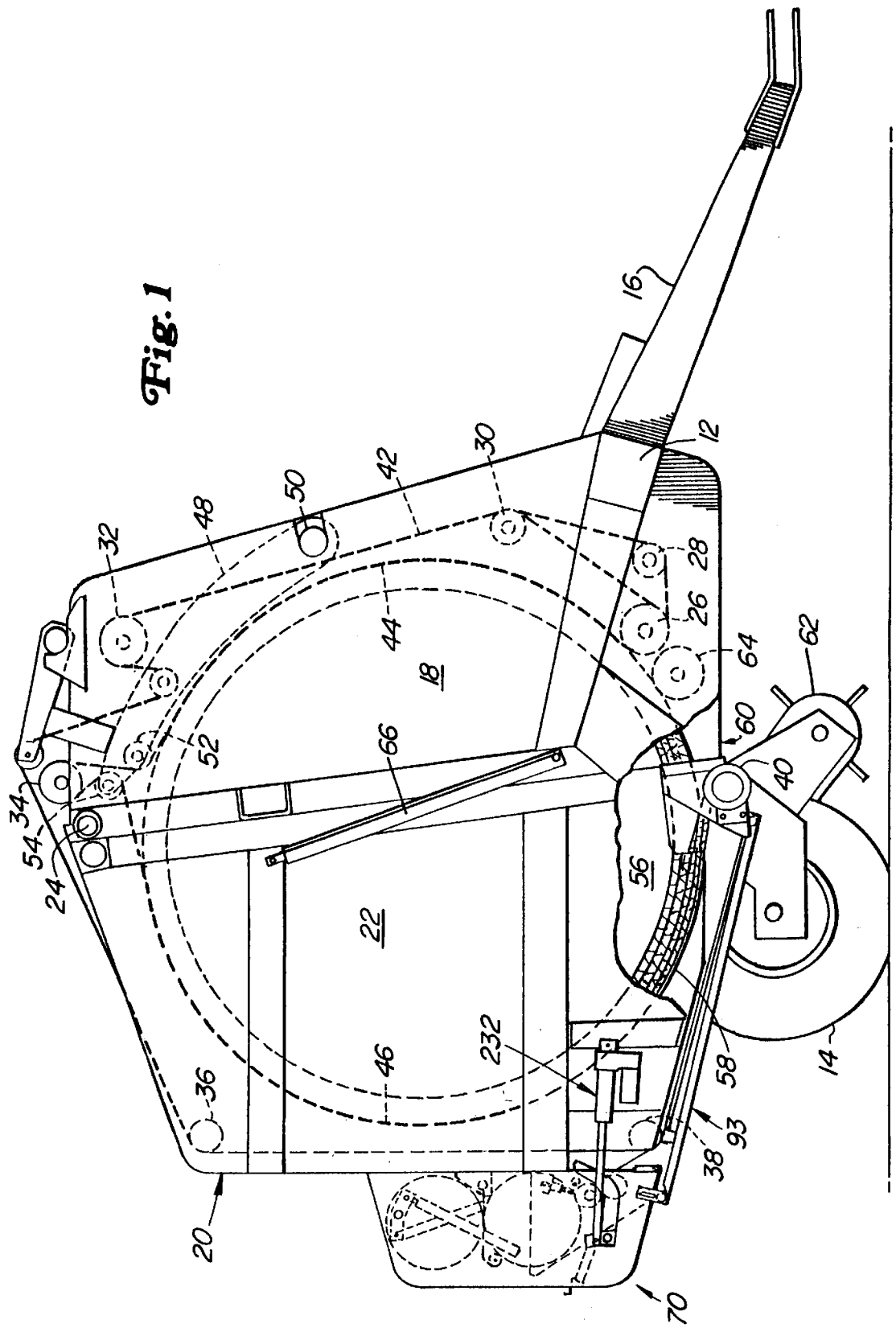
FIG. 1 is a right side elevational view of a large round baler equipped with a system for delivering a web of wrapping material to the baling chamber constructed in accordance with the present invention.

Initially, it is to be noted that various components are described as existing in pairs while only one of each pair is shown and it is to be understood that the unshown component is the same or similar in construction to the one shown.

Referring now to FIG. 1, there is shown a baler 10 of the type for making large cylindrical bales and commonly called a large round baler. The baler 10 comprises a main frame 12 supported on a pair of ground wheels 14 and having a draft tongue 16 secured thereto and adapted for being connected to a tractor. A pair of transversely spaced vertical sidewalls 18 is joined to the frame 12 and has respective upright rear ends. A bale discharge gate 20 including opposite sidewalls 22 is vertically pivotally attached, as at 24, to upper rear locations of the sidewalls 18, the sidewalls 22 having forward ends which abut against the rearward ends of the sidewalls 18 when the gate 20 is in a lowered closed position as shown.

The pairs of sidewalls 18 and 22 rotatably support the opposite ends of a plurality of bale-forming belt support rolls adjacent the periphery of the sidewalls. Specifically, beginning at a lower central location of the sidewalls 18 and proceeding counterclockwise, there are mounted a driven roll 26, a lower front roll 28, an intermediate front roll 30, an upper front roll 32, and an upper rear roll 34; and continuing counterclockwise from an upper rear location of the gate sidewalls 22 there is mounted an upper rear roll 36, a lower rear roll 38 and a lower front roll 40. Located between the pairs of sidewalls 18 and 22 and supported in side-by-side relationship to one another across the various belt support rolls are a plurality of endless bale-forming belts 42. Except for some of the belts 42 which skip the lower front roll 28, the belts are trained so that they serially engage the rolls 26, 28, 30, 32, 36, 38, 40 and 34. A front run 44 of the belts 42 extends upwardly from the driven roll 26 to the roll 34. Similarly, a rear run 46 of the belts 42 extends upwardly from the lower front gate roll 40 to the roll 34. Mounted between rear end locations of a pair of rearwardly extending tensioning arms 48, which are vertically pivotally mounted, as at 50, to a mid-height location at the front of the sidewalls 18, are closely spaced, front and rear idler rolls 52 and 54, with the belt runs 44 and 46 cooperating with the sidewalls 18 and 22 to define an expansible baling or bale-forming chamber 56, closed at its top by the idler rolls 52 and 54, and here shown in a state of considerable expansion and containing a bale 58. When the chamber 56 is empty, the front and rear runs 44 and 46 of the belts 42 respectively converge upwardly from the drive roll 26 and lower front gate roll 40 and pass closely to each other between the rolls 52 and 54, with the run 44 contacting a rear surface of the front roll 52 and with the run 46 contacting a forward surface of the rear roll 54, the chamber 56 thus being wedge-shaped as viewed from the side. The bottom of the chamber 56 is provided with a crop inlet 60 extending between the driven roll 26 and the lower front gate roll 40. Crop products are introduced into the inlet 60 by a pickup 62 for being rolled into a bale, such as the bale 58 by the action of the front and rear runs 44 and 46 of the belts 42, which are respectively driven so as to travel toward and away from the inlet, and initially also by a starter roll 64 rotatably mounted in the sidewalls 18 adjacent to and being driven in the same direction as the driven roll 26 so that it operates to strip crop being carried downwardly by the front run of belts 44. As the bale 58 is being formed, the chamber 56 yieldably expands, to a predetermined size as shown, against the force established in the belts by a tensioning system including the pair of tensioning arms 48 together with a pair of tensioning springs (not shown) and a pair of hydraulic cylinders (not shown) coupled between the walls 18 and the arms 48 for resisting upward movement of the arms, in a manner well known in the art. A pair of gate cylinders 66 are provided for swinging the gate 20 upwardly, about the pivotal attachment 24, to an open position when it is desired to discharge the bale 58 onto the ground.

Referring now also to FIGS. 2, there is shown a net wrapping assembly 70 mounted to the rear and bottom of the discharge gate 20 for wrapping bales formed in the baling chamber 56, such as the bale 58, prior to the bales being discharged onto the ground. It is to be noted that the assembly 70 is designed, in a manner described below, for dispensing a web of net material having a width that is greater than the width of the baling chamber 56 in such a way that the net material extends over the end corners of the bale 58. Specifically, the assembly 70 includes a support structure, mounted to the bottom half of the rear of the gate 20, comprising a transverse vertical panel 72 extending across and being fixed to vertical flanges respectively defining rear ends of the opposite sidewalls 22 of the gate. The panel 72 has an upper end which is defined by a downwardly and rearwardly extending flange 74. Bolted to upper right- and left-hand areas of the panel 72 beneath the flange 74 are respective transverse legs of a pair of angular, crank arm support brackets 76. Spaced vertically below the pair of support brackets 76 and having transverse legs bolted to the panel 72 are a pair of angular biasing arm support brackets 80. The support structure of the wrapping assembly 70 further includes a pair of longitudinally extending, vertical support walls 84, which are approximately right-triangular in side view and have forward, vertical sides defined by transverse flanges that overlap a lower portion of the panel 72 and are secured, as by threaded fasteners, not shown, to structure at the rear of the gate 20 so as to be spaced transversely from each other by a distance greater than the distance between the gate sidewalls 22, i.e., greater than the width of the baling chamber 56.

Extending between and having their opposite ends rotatably mounted to the support walls 84 are a pair of wrap material feed rolls 86 and 88, with the roll 86 being disposed above and rearwardly of the roll 88 such that a wrap material flight path, defined by a plane disposed tangentially to the rolls at their bite or nip, passes beneath the panel 72 and intersects a vertical run of the belts 42, that extends between the upper and lower belt support rolls 36 and 38, respectively. The net material flight path intersects the belts 42 at a location above a nip or bite 90 defined by a net material guide pan portion 92, forming part of a wrap material guide assembly 93, and a portion of the belts 42 engaged with the lower rear support roll 38. The upper net feed roll 86 is mounted so as to be biased toward the lower net feed roll 88. Specifically, fixed to outer surfaces of each of the walls 84 is a u-shaped bracket 94. Located below, and having an out-turned upper end disposed parallel to, each of the brackets 94 is a quill mounting strap 95 containing an elongated slot in which is received a guide pin or bolt 96 which is fixed to the adjacent wall 84. A pair of bolts 97 respectively project upwardly through the pair of out-turned ends of the quill mounting strap 95 and through the adjacent bracket 94, and each are held in an adjusted position by a nut 98 received on a threaded upper end thereof. A coil spring 100 is located on each bolt 97 and is loaded between the associated bracket 94 and quill mounting strap 95. Projecting through a central location along the length of each of the straps 95 and through a circular clearance opening 101 provided in the adjacent wall 84 is a feed roll mounting bolt 102 that serves to rotatably mount the feed roll 86 to a quill carried by the strap 95, with movement of the roll toward and away from the lower roll 88 being permitted by the respective slots in the lower portions of the straps 95. A wrap material guide roll 103 is located adjacent an upper forward portion of the upper feed roll 86 and extends between and is rotatably mounted to the lower end of a strap 104, fixed to the left-hand support wall 84, and to the forward end of a roll lift handle 105 pivotally mounted, as at 106, to the right-hand support wall 84. The roll 103 is mounted to the handle 105 by a pin 107 that extends through a slot 108 formed arcuately in the wall 84 about the pin 106. When the right-hand end of the roll 103 is in a lowered working position with the mounting pin 107 in the bottom of the slot 108, a rear portion of the handle 105 extends above and rests on a stop pin 110 fixed to a rear location of the wall 84. When it is desired to place a length of net about the roll 103, as described below, the rear portion of the handle 105 is pulled or deflected outwardly beyond the stop pin 110 and lowered to lift the right-hand end of the roll 103 which results in the pin 107 moving to the top of the slot 108. The handle 105 is then retained in its lowered position by placing it beneath the stop pin 110.

The upper feed roll 86 is preferably in the form of a metal core having or being covered with a high friction surface, such as rubber, and, as viewed in FIG. 2, is driven counter-clockwise. The drive for the roll 86 is a variable speed pulley and belt arrangement (not shown) including a pulley mounted to a shaft coupled as an extension of the lower support roll 38 so that there is always a direct relationship between the speed of the bale-forming belts 42 and the peripheral speed of the wrap material feed rolls 86 and 88. The variable speed drive is then adjusted such that the belts 42 are traveling at a predetermined amount greater than the peripheral speed of the net material feed rolls so as to produce a relatively high tension in the net wrap material during wrapping of the bale 58, this tension being ideally as high as it can be without the material rupturing or being prone to rupture during handling of the wrapped bale.

An active net wrap material supply roll 112 is supported, to a minimal extent, if at all, before any material is used and with the feed rolls 86 and 88 in a standby or non-driven condition, by a pair of planar end supports or pads 114 respectively extending transversely from the support walls 84 and being inclined slightly downwardly towards and terminating adjacent an approximate mid-height location of the upper feed roll 86. It is significant to note that when the feed rolls 86 and 88 are being driven, the tension in the net segment extending between the guide roll 103 and the nip between the supply roll 112 and the upper feed roll 86 will tend to place the entire weight of the supply roll 112 on the feed roll 86. The primary purpose of the end supports 114 is as an aid in placing the material roll 112 in its operational position on the feed roll 86.

Provided for pressing the active wrap material supply roll 112 into engagement with the feed roll 86 is a biasing assembly 116 comprising a pair of transversely spaced arms 118 having their forward ends pivotally attached, as by a pair of pins 120, to the pair of brackets 80. A roller 122 is rotatably mounted in the rear ends of the arms 118, so as to be substantially free-running, and is located so as to maintain engagement with an upper rear quadrant of the wrap material active roll 112 as the roll becomes smaller as material is used in wrapping bales. The biasing assembly 116 further includes a pair of links 124 having lower ends respectively pivotally received on a pair of pins 126 welded to the arms 118, and having upper ends respectively pivotally coupled, as by a pair of pins 128, to rearward legs of a pair of crank arms 130 respectively pivotally connected, as by pins 132, to the pair of crankarm support brackets 76. A yieldable force for biasing the roller 122 against the active wrap material supply roll 112 is provided by a pair of gas or air cylinders 134 having their rod ends respectively pivotally connected, as by a pair of pins 136, to forward legs of the pair of crank arms 130, and having their cylinder ends respectively pivotally connected, as by a pair of pins 138, to opposite sidewalls of a cover 140. The cover 140 has an upper wall pivotally mounted to the panel flange 74 by a hinge structure 142 which permits the cover 140 to be swung upwardly, from its lowered closed position, shown in solid lines, wherein upright front ends of the sidewalls are in engagement with the backside of the discharge gate 20, to a raised open position angularly displaced in excess of 90° from its closed position, as shown in broken lines. In addition to biasing the roller 122 against the wrap material supply roll 112, the geometrical relationship between the lines of action of the cylinders 134 and the pivotal connections 132 of the crank arms 130 are such that the cylinders 134 move over center and act to yieldably retain the cover 140 in its open position. The cover 140 is releasably retained in its closed position by a latch member 144 which is received in an opening of a latch retainer 146 extending between and fixed to the support sidewalls 84. A latch handle 148 is pivotally mounted to a central location of a rear wall of the cover 140 and is operable for selectively moving the latch member 144 to and from latching engagement with the retainer 146.

Stored above and in close proximity to the wrap material active roll 112 is a wrap material spare supply roll 150. Structure for supporting the spare roll 150 includes a pair of upright legs 152 respectively including out-turned ends yieldably secured to horizontal flanges defining upper sides of the support structure sidewalls 84. Specifically, the yieldable connection of each of the legs 152 to the associated sidewall 84 is defined by a bolt 154 projecting downwardly through aligned holes provided in the leg end and the sidewall flange and carrying a coil compression spring 156 held in place by a nut 158 received on the lower end of the bolt 154. A rivet 159 extends upwardly through each of the out-turned ends of the legs 152 and has a head (not visible) forming a detent that is received in a hole in a respective one of the horizontal flanges of the sidewalls 84. Extending transversely inwardly a short distance from and being fixed to each leg 152, at a location spaced downwardly from the top of the leg, is a sheet metal plate 160 that is arcuately curved so as to define a concave upper support surface or saddle on which rests the lower rear quadrant of a respective end of the spare roll 150.

It is here noted that the resilient mounting of the legs 152 permits each of them to be manually turned about the vertical axis defined by the bolt 154, once the head of the rivet 159 is lifted out of the hole in the support flange, as is desirable during moving of the spare supply roll 150 into place as the active supply roll once the active roll becomes depleted. Specifically, in repositioning the spare roll 150, the cover 140 is first raised to its open position and the empty core of the active roll removed. A pair of roll loading supports 161, in the form of straps pivotally mounted, at respective locations approximately at the height of the roll end supports 114, for being swung about an upright axis, are then pivoted from laterally extending stored positions, as shown in solid lines, to rearwardly extending support positions, shown in broken lines. The right-hand end of the guide roll 103 is then elevated by moving the handle 105 to its lowered position beneath the stop pin 110. The spare roll 150 is then lowered onto the supports 161. A length of net is then pulled off the front of the spare supply roll 150 and fed downwardly in front of, and then rearwardly about the guide roll 103 and over the upper feed roll 86 and then forwardly through the nip between the feed rolls 86 and 88. The right-hand end of the guide roll 103 is then returned to its operative position by moving the handle 105 to its stored position on top of the stop pin 110. The legs 152 of the roll end supports are then lifted, to disengage the heads of the rivets 159 from their respective retaining holes, and rotated 180° so that the roll end support plates 160 project outwardly. With the plates 160 out of the way, the biasing assembly arms 118, together with the pressure applying roller 122, are manually raised to a substantially vertical position, as shown in broken lines, where they are over center and remain raised. With the roller 122 out of the way, the spare roll 150 may be rolled into place over the planar roll end supports 114 and onto the feed roll 86. The arms 118 are then lowered so that the roller 122 engages the new active roll of wrap material. The loading supports 161 are then rotated back to their stored positions, the support plates 160 returned to their operative positions and the cover 140 closed. When convenient, the removed spare roll is replaced by a new spare roll by once again opening the cover 140, pivoting the loading supports 161 to their load position, rolling a new spare roll onto the loading supports 161, and then lifting the roll from there, one end at a time if desired, onto the support plates 160. The cover 140 is then closed.

Thus, it will be appreciated that the spare wrap material supply roll 150 is mounted conveniently under the cover 140 directly above the active wrap material supply roll 112 for easy movement into place for replacing the active supply roll when the latter becomes depleted.

I claim:

1. In a wrapping mechanism for a large round baler including a support structure defining a first support zone, having a bottom defined by an active roll support surface, adapted for receiving an active supply roll of wrapping material and a spare roll support surface located approximately vertically above said first support zone at a bottom of a second support zone adapted for receiving a spare supply roll of wrapping material the improvement comprising: said spare roll support surface being defined by a pair of roll end supports respectively joined to and protecting inwardly from a pair of upright legs straddling said first support zone; a pair of horizontal supports respectively being provided at lower ends of said pair of legs; said pair of legs respectively having out-turned ends positioned on respective ones of said pair of horizontal supports; a bolt projecting through each out-turned end and the associated horizontal support; a coil compression spring located on each bolt; and a nut received on each bolt for loading the adjacent spring for urging the adjacent leg against the associated horizontal support, whereby each leg is yieldably mounted for rotating about an axis defined by an associated one of the bolts.

2. The wrapping mechanism defined in claim 1 wherein each of said out-turned lower ends of said legs includes a detent; and each horizontal support includes a hole receiving an adjacent one of said detents, whereby each detent must be lifted out of its associated hole before the associated legs is rotated about said axis.

3. A wrapping mechanism for a large round baler comprising: a support structure defining lower and upper zones respectively adapted for holding active and spare supply rolls of wrapping material; a bottom of said upper zone being defined by a pair of laterally spaced roll end supports joined to legs straddling said lower zone; said roll end supports adapted for supporting a snare supply roll located within said upper zone when said active supply roll of wrapping material is located in said lower zone; a pressure-applying device including a pair of arms mounted for pivoting in respective planes located inwardly of said pair of legs, beneath said roll end supports, and a pressure-applying cross member being connected to said pair of arms in a position for engaging said active supply roll; and said legs each being mounted for rotating about an upright axis for disposing said roll end supports in opposite outwardly projecting positions, after the spare supply roll is removed from said roll end supports, thereby moving the roll end supports out of the way for permitting the cross member to be swung upwardly out of the way so as to permit the spare supply roll to be loaded into said lower zone to replace a depleted active supply roll.

4. The wrapping mechanism defined in claim 3 wherein an upper wrap material feed roll is rotatable mounted at a bottom of said lower zone and is adapted for supporting said active roll of wrapping material; a wrapping material guide roll being mounted adjacent said upper wrap material feed roll; means mounting said wrapping material guide roll for being selectively raised to a threading position; and a pair of loading supports being located rearwardly of said lower zone for supporting the spare supply roll of wrapping material in such relationship to said guide roll that, once at least one end of said guide roll is raised, said spare roll may be moved to said loading supports where a length of wrapping material may be easily pulled from the spare supply roll and threaded about the guide roll and around the feed roll.

5. The wrapping mechanism defined in claim 4 wherein said means for mounting said at least one end of said guide roll for being selectively raised to said threading position comprises a lever coupled to said at least one end of said guide roll and being pivotally mounted for moving said end of said guide roll between a lowered working position and said threading position; and a stop for selectively retaining the lever in respective positions corresponding to said working and threading positions of said guide roll.

6. The wrapping mechanism defined in claim 3 and further including a cover being mounted in covering relationship to the force applying device, the spare roll end supports and the wrap material feed rolls; and a pair of gas springs being coupled between the cover and said force applying device for generating the force which is applied by the cross member and for maintaining the cover in an open position.

* * * * *

UNITED STATES PATENT AND TRADEMARK OFFICE
CERTIFICATE OF CORRECTION

PATENT NO. : 5,979,141
DATED : November 9, 1999
INVENTOR(S) : Kenneth Craig Phillips It is certified that error appears in the above-identified patent and that said Letters Patent is hereby corrected as shown below:

Column 6, line 36, delete "protecting" and insert -- projecting --.
Column 6, line 60, delete "snare" and insert -- spare --.
Column 7, line 9, delete "rotatable" and insert -- rotatably --.

Signed and Sealed this

Twenty-third Day of January, 2001

Attest:

Q. TODD DICKINSON

Attesting Officer

Commissioner of Patents and Trademarks